(12) United States Patent
Zhang et al.

(10) Patent No.: US 8,375,143 B2
(45) Date of Patent: Feb. 12, 2013

(54) METHOD OF TRANSCODING CONTENT, TRANSCODER UNIT, AND UPNP NETWORK SYSTEM

(75) Inventors: Yaonan Zhang, Eindhoven (NL); Ewout Brandsma, Eindhoven (NL)

(73) Assignee: NXP B.V., Eindhoven (NL)

( * ) Notice: Subject to any disclaimer, the term of this patent is extended or adjusted under 35 U.S.C. 154(b) by 240 days.

(21) Appl. No.: 12/676,607

(22) PCT Filed: Apr. 8, 2008

(86) PCT No.: PCT/IB2008/051334
§ 371 (c)(1),
(2), (4) Date: Mar. 5, 2010

(87) PCT Pub. No.: WO2009/034483
PCT Pub. Date: Mar. 19, 2009

(65) Prior Publication Data
US 2010/0306411 A1     Dec. 2, 2010

(30) Foreign Application Priority Data
Sep. 11, 2007   (EP) ..................... 07116092

(51) Int. Cl.
*G06F 15/16*   (2006.01)
(52) U.S. Cl. ........................ 709/246; 709/247
(58) Field of Classification Search ............. 709/246
See application file for complete search history.

(56) References Cited

U.S. PATENT DOCUMENTS

| | | | |
|---|---|---|---|
| 2005/0138137 A1* | 6/2005 | Encarnacion et al. | 709/217 |
| 2005/0235077 A1 | 10/2005 | Kubota | |
| 2006/0161635 A1* | 7/2006 | Lamkin et al. | 709/217 |

FOREIGN PATENT DOCUMENTS

WO      2005/079071 A1     8/2005

OTHER PUBLICATIONS

International Search Report for International Patent Application PCT/IB2008/051334 (Sep. 11, 2008), Included in WO 20091034483A1.

* cited by examiner

*Primary Examiner* — Adnan Mirza

(57) ABSTRACT

A method of transcoding a content stored on a first server (OS) is provided. The first server (OS) is arranged within an UPnP network comprising at least one first server (OS), at least one UPnP renderer (UR) and at least one UPnP control point (CP). The content directory services (CDS) of the at least one first server (OS) are browsed to determine the available content and the available encodings of the content. The rendering capabilities of the at least one renderer (UR) are determined. The rendering capabilities of the at least one renderer (UR) are compared with the available content and the available encoding of the content according to the content directory service of the at least one server (OS). The content directory service (CDS) of the at least one server (OS) is updated.

15 Claims, 3 Drawing Sheets

METHOD OF TRANSCODING CONTENT, TRANSCODER UNIT, AND UPNP NETWORK SYSTEM

FIELD OF THE INVENTION

The present invention relates to a method of transcoding content, a transcoder unit and a UPnP network system.

BACKGROUND OF THE INVENTION

The universal plug and play UPnP protocol constitutes a set of computer network protocols allowing devices to connect seamlessly and to simplify the implementations of networks for data sharing, communication and entertainment. Furthermore, the UPnP is a device control protocol which is built upon open internet-based communication standards. The UPnP architecture allows a peer-to-peer networking of personal computers, network appliances and wireless devices. The UPnP architecture is an open architecture based on TCP/IP, UDP and HTTP. The UPnP architecture is described on http://www.upnp.org/resources/upnpresources.zip. The UPnP networking is relying on IP addressing. Therefore, each device must have a dynamic host configuration protocol DHCP client and search for a DHCP server when it is connected to the network. If no DHCP servers are available, the device must assign itself an IP address.

The UPnP protocol is based on several steps, namely discovery, description, control, event notification and presentation. In the first step, a discovery of a device within the network based on its IP address is performed. In the next step, a device description must be performed. After a UPnP control point has discovered the device, the control point must retrieve the device description for example from the Uniform Resource Identifier URI provided by the device in the discovery message. The description may include the model name, number, serial number, manufacturer name, etc. In the next step, the control point can send actions to the device to control the device and the services of the device. A further step in the UPnP protocol is the event notification. An UPnP description for a service may include a list of actions to which the service will respond to as well as a list of variables that may model the state of the service at run time. The service may send event messages (names of one or more state variables and current value of these variables). Finally, a control point may retrieve information (like a page from the URL of the device) and load this information for example into a web browser.

The UPnP may also be applied to audio and video. Here, a UPnP media server may be a UPnP server sharing or streaming media data to UPnP clients or renderers in the network. An UPnP media server control point is a UPnP client which can also detect UPnP services on the network to browse and stream media and data files on the UPnP servers, in particular the content directory service CDS of the servers. An UPnP media renderer is a device rendering content. An UPnP rendering control DCP enables a control of the media renderer settings like volume, brightness, RGB, sharpness, etc.

FIG. 1 shows a schematic representation of a basic UPnP AV audio video architecture. An UPnP control point, a UPnP renderer and a UPnP server is provided. The UPnP control point CP is used to discover the UPnP devices in the UPnP network, i.e. it finds or discovers the UPnP server US and the UPnP renderer UR. It is also possible the UPnP control point CP and the UPnP renderer UR are combined into a single (physical) device. In such a case, the use of a local UPnP renderer UR is applied and only the UPnP server and its content will be located through the UPnP protocol based on the content directory service CDS.

When the UPnP server US has been discovered by the UPnP control point CP, the control point will browse or search through the content directory service CDS. In the content directory service, a list of content items tagged as <item> may be present. Each individual <item> will contain an amount of metadata like a resource tag as <res>. The <res> provides a link to the actual physical content (URL). The <res> metadata may contain information regarding the encoding of the content which may be part of the protocol info. The control point CP will compare and match the information regarding the encoding of the content with the decoding capabilities of the UPnP renderer. Thereafter, the control point CP may present a list of content to the end user which is then able to select a particular content to be rendered. The control point CP can also be used to accordingly instruct the UPnP renderer UR to play the desired content. This may be performed by a HTTP player HP in the renderer UR which receives HTTP streaming data from a HTTP server HS in the UPnP server. However, if the control point CP can not find the required encoding of the <item> in the content directory service CDS, a transcoder is required to provide for the required encoding of the <item>.

An UPnP server may therefore comprise a transcoder to provide multiple formats of the content on the server. The transcoding can either be generated off-line or on-line. The network transcoder can also be implemented as a separate UPnP entity with its own UPnP-CDS content directory service. The content directory service CDS may contain links to original content items on other UPnP servers in the network. It may contain links to alternate encodings of these content items by providing additional <res> for those <items>. In other words, the UPnP transcoder indicates alternate encodings as part of its own UPnP-CDS. The UPnP transcoder re-exposes all content it can find on the network in all possible encodings. As a result, a great number of extra <res> entries in its content directory service may be present, which may not be required.

<res> is an XML tag returned by the UPnP-CDS as a result of a browse or search action. The browse or search result contain a list of content items which may be tagged as <item>, wherein each individual <item> carries an amount of metadata. The <res> is part of this metadata and provides a link to the actual physical content, this link can be URL. Therefore, several <res> for a single <item> are allowed. In other words, multiple URL are allowed for a single <item>. The <res> may be provided to indicate an alternate encoding of the content.

US 2005/0138137 describes UPnP network where URL are parameterized to indicate the desired encoding.

US 2005/0235077 discloses a network transcoder. This is performed by matching source and the destination with a transcoder or formatter in between to perform the required transcoding.

Although the above described transcoder allows the provision of additional encodings for other UPnP AV servers on the network, these additional encodings are only exposed through content directory service CDS of the transcoder but not through the CDS of the original server. Accordingly, to find the required encoding of <item>, the end user may have to search in the transcoder server instead of the original server to locate the required encoding. This is clearly not a transparent implementation and is therefore not easy to use. Furthermore, prior art network transcoders may re-expose all content it can find on the network in all possible encodings which may lead to an excessive number of additional <res> entries which are not required.

SUMMARY OF THE INVENTION

It is therefore an object of the invention to provide a transcoding method which is easy to use and which allows a transparent use of different encodings of a required <item>.

This object is solved by a transcoding method according to claim 1, a transcoder unit according to claim 12 and a UPnP network system according to claim 14.

Therefore, a method of transcoding a content stored on a first server is provided. The first server is arranged within an UPnP network comprising at least one first server, at least one UPnP renderer and at least one UPnP control point. The content directory services of the at least one first server are browsed to determine the available content and the available encodings of the content. The rendering capabilities of the at least one renderer are determined. The rendering capabilities of the at least one renderer are compared with the available content and the available encoding of the content according to the content directory service of the at least one server. The content directory service of the at least one server is updated.

According to an aspect of the invention, at least one additional resource element relating to a required encoding of the content or an additional content relating to an encoding of a further content is added to the content directory service of the at least one first server if the content directory service of the at least one first server does not contain the required encoding of the content. By providing the additional resource element with respect to the required encoding which is previously not included into the content directory service, the content directory service can be updated to ensure that a content can be encoded or transcoded into the required encoding when required.

According to a further aspect of the invention, the additional resource element contains information with respect to the URL of the required encoding of the content.

According to a further aspect of the invention, the transcoding of the content into the required encoding is performed such that at least one renderer is able to render the content.

According to a further aspect of the invention, the resource element comprises information with respect to a transcoding service for transcoding the content into the required encoding. The transcoding service is arranged either within or outside the UPnP network.

According to still a further aspect of the invention, the content is encoded by the transcoding service into a coding which is required by the renderer.

According to still a further aspect of the invention, the resource element which is added into the content directory service contains an URL pointing to the original content, the required encoding of the content and/or information with respect to the original encoding of the content.

The invention relates to the idea to patch content directory services CDS of the original UPnP servers to insert additional <res> elements for additional encodings of the content items. These additional encodings may be provided by the transcoding capabilities of an active network transcoder. It should be noted that they are preferably not provided through an additional CDS associated to the network transcoder. Accordingly, additional encodings are becoming transparently available on the network. This means that an end user can allocate the familiar content items on their familiar servers, wherein more content becomes playable on the renderers.

In addition, only <res> elements for additional encodings are provided which are actually required such that the content can be playable on the renderers that are actually present on the network. In other words, encodings that are not required by the renderers present in the network are not provided thus limiting the total number of <res> elements. The principles of the invention may also be applied to transcoders which are not implemented as a network transcoder. The transcoder will only provide alternative encodings for the content items provided on its associated server. Furthermore, the transcoder will only provide those alternative encodings which may be required by the renderers in the network.

Additional aspects of the invention are defined in the dependent claims.

BRIEF DESCRIPTION OF THE DRAWINGS

Advantages and embodiments of the invention will now be described in more detail with reference to the Figures.

DETAILED DESCRIPTION OF EMBODIMENTS

Figure 1:
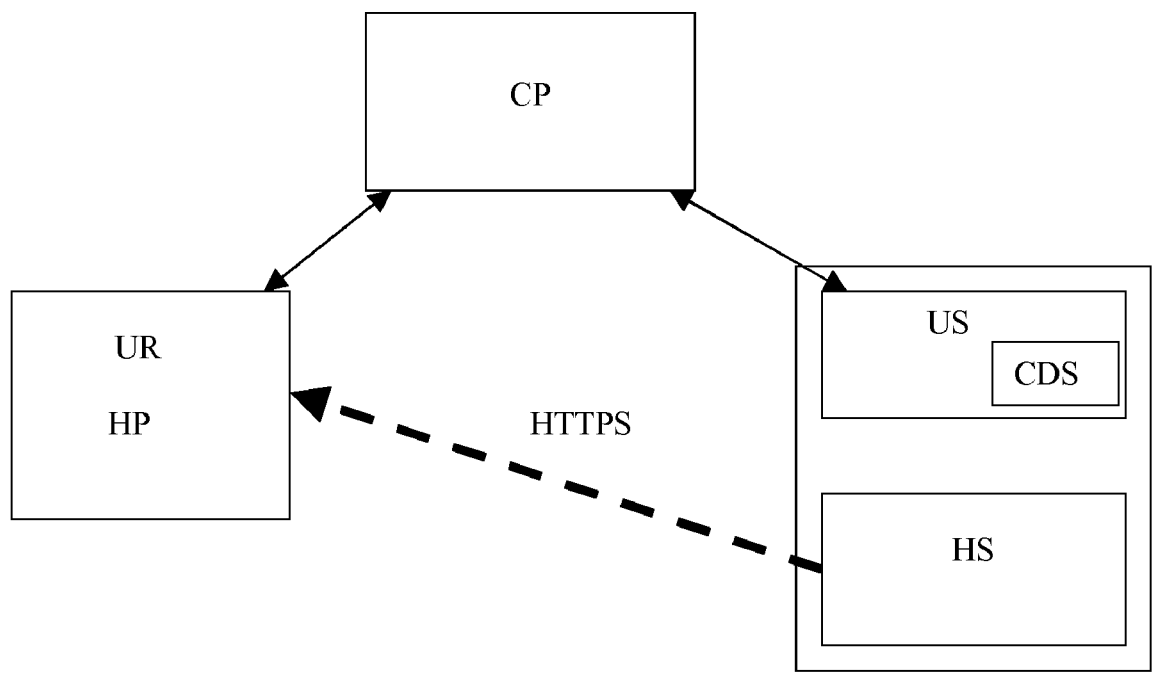
FIG. 1 shows a block diagram of the basic architecture of an UPnP AV network according to the prior art.
Figure 2:
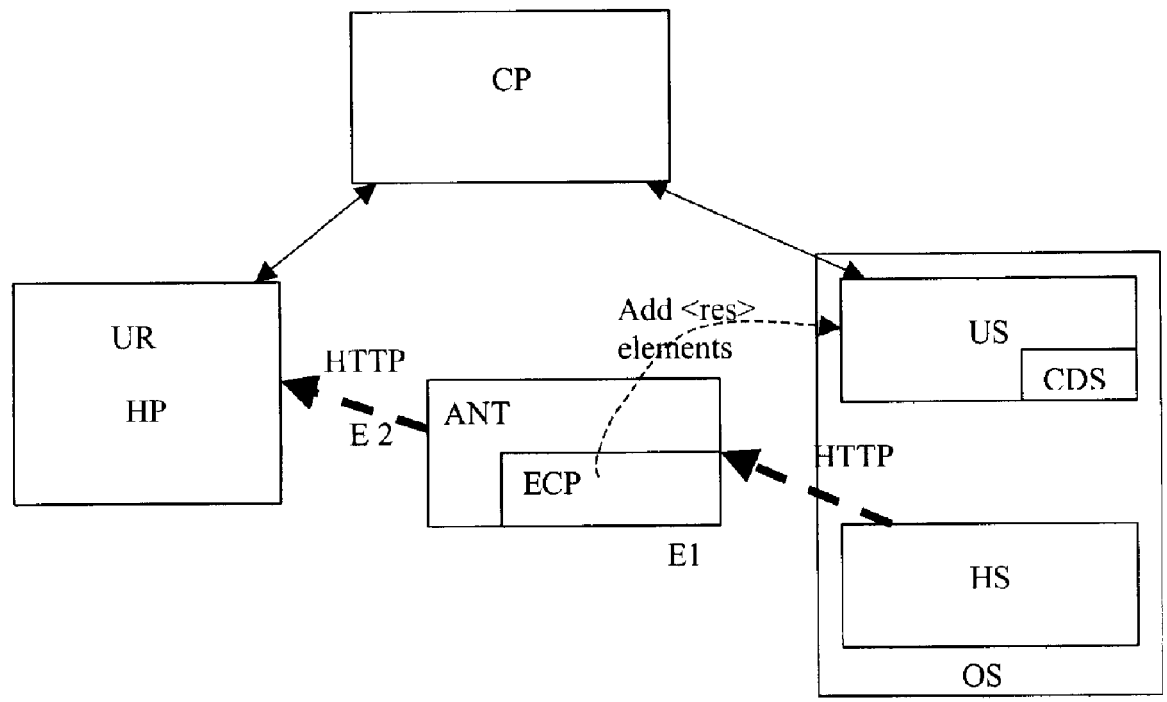
FIG. 2 shows a block diagram of the basic architecture an UPnP network according to a first embodiment.

FIG. 2 shows a schematic block diagram of an UPnP network according to the first embodiment. The architecture according to the first embodiment substantially corresponds to the architecture according to FIG. 1, wherein an active network transcoder ANT is additionally provided. The active network transcoder ANT will be arranged logically or functionally between the HTTP server HS and the UPnP renderer UR to perform a transcoding from a first encoding provided on the HTTP server to a second encoding required by the renderer UR. The active network transcoder ANT according to the first embodiment can comprise a control point unit ECP, which may be implemented as an embedded control point unit. The active network transcoder ANT and in particular the control point unit ECP are adapted to scan the content directory services CDS of all or any subset of the UPnP servers US in the network. It should be noted that although only a single UPnP renderer UR and a single UPnP server are depicted in FIG. 2, the UPnP network may comprise a plurality of renderers UR and a plurality of UPnP servers US. For each of the items found in the content directory services CDS of the servers US, the active network transcoder ANT compares the available encodings of the content with the rendering capabilities of the renderers. The encoding may relate to the type of video codec like H.264, its use of profile and level like HP@L4, the type of audio codec like AAC, its use of profile and level like HEAACv2@L4, the multiplex type like the transport stream or the like. Furthermore, the encoding may also indicate the streaming protocol like HTTP. Therefore, the active network transcoder may also be implemented as a protocol converter for example from RTSP/RTP to HTTP. The transcoder may also be implemented as a combine protocol converter and transcoder.

If the active network transcoder ANT has determined that the rendering capabilities of the renderers in the network and the available encodings of the content do not match, the control point unit ECP can introduce a further resource element tagged as <res> to the corresponding item tagged as <item> in the content director service CDS of the original server OS. The additional entry of the <res> will provide the required information for an additional encoding (of the content) that is supported by the renderers in the network. The additional encoding may only be supported by one or some (not all) of the renderers. Therefore, the active network transcoder ANT may insert a plurality of <res> for a certain <item>. The new <res> includes information of the URL which will point to the active network transcoder and not to the original server OS. The active network transcoder ANT must be adapted to resolve this URL into the URL of the original item on the original server. Furthermore, the active network transcoder ANT must keep track which transcoding operation is to be applied for this content.

This can for example be accomplished by a parameterized URL wherein one parameter corresponds to the second URL pointing to the original content on the original server OS while a further parameter relates to the desired encoding of the content. Furthermore, a third parameter may relate to the original encoding. After the active network transcoder ANT has entered the new <res> element into the content director service CDS of the original server OS, it is optionally not required that the active network transcoder stores the state information about the transcoding incidence. Preferably, all required information is captured in the <res> element which may include its URL. If the UPnP control point CP in the network selects a resource tagged as <res> which contains an URL pointing to the transcoder, the renderer will fetch the required stream from the transcoder for example by means of the HTTP streaming protocol. It should be noted, that the protocol to be used (HTTP or RTSP) may also part of the URL. E.g. http://10.0.0.153/ . . . or rtsp://10.0.0.153. However, it should be noted that also other streaming protocols are possible like RTSP/RTP. In such a case the transcoder will retrieve the required data from the original server and forms the required transcoding of the content.

The adding of the resource element should be performed through standardized UPnP operations. A preferred method is to change the metadata of an object item by means of the CDS: (UpdateObject( )). It should be noted, that this is only possible if (a) the server implements UpdateObject (optional requirement in UPnP-CDS) and (b) the server permits changing of the object item by setting its restricted attribute to FALSE. If UpdateObject is not supported, a copy of the item (CreateObject) with additional <res> may be created and then the original (DeleteObject) item may be deleted.

Optionally, the active network transcoder ANT may comprise a memory for storing a list of renderers and their decoding capabilities which have been present in the network in the past but are currently not present. The active network transcoder ANT may also perform the above described process also for renderers stored in the memory. This is in particular advantageous for UPnP renderers UR which are not constantly connected to the network like portable devices or mobile devices.

In addition or alternatively, the list of renderers UR for which an encoding may be required may be defined by the end user for example to exclude guest devices.

Figure 3:
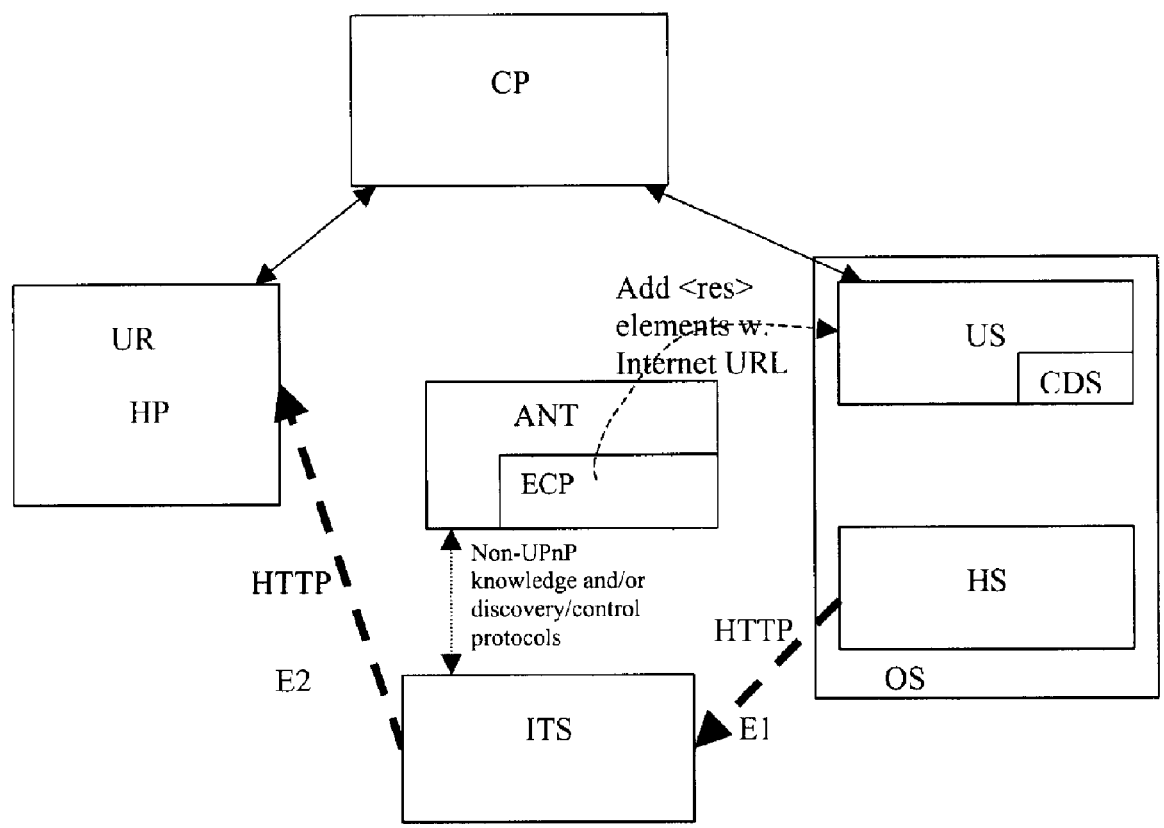
FIG. 3 shows a block diagram of a basic architecture of an UPnP network according to a second embodiment.

FIG. 3 shows a block diagram of an UPnP architecture according to a second embodiment. The architecture according to the second embodiment substantially corresponds to the architecture according to the second embodiment. In addition, an internet transcoding service ITS is provided. According to the second embodiment, the transcoding of the content on the original server OS can also be performed by the internet transcoding service ITS. Therefore, the active network transcoder ANT is adapted to provide the URL of the internet transcoding service ITS.

While according to the first embodiment the active network transcoder ANT is arranged in the loop of the transcoding operation, the active network transcoder ANT is now not in this transcoding loop any more. In fact, the transcoding loop is present between the original server OS where the content is stored, the INT and the UPnP renderer UR. However, the active network transcoder ANT is still adapted to scan the home network and in particular the content directory services CDS of all UPnP servers US in the network as well as the UPnP renderers UR arranged in the network. As in the first embodiment the active network transcoder according to the second embodiment is creating additional <res> entries in the CDS of the UPnP servers US. The <res> entries will, however, not contain a direct URL to the active network transcoder ANT but this entry will contain preferably parameterized URL pointing to the internet transcoder service ITS.

Therefore, the active network transcoder ANT will maintain the available transcoding services in the internet and the protocols to access these internet transcoding services ITS. The active network transcoder ANT according to the second embodiment is adapted to control the transcoding via the ITS. This communication with the external ITS will not be based on an UPnP communication as such a communication is limited to the network, i.e. any server on the internet cannot directly interact with UPnP devices in the network.

According to a third embodiment, the active network transcoder according to the first or second embodiment can—after browsing or searching the CDS of the UPnP servers US and after browsing or searching the rendering capabilities of the UPnP renderers UR—transcode any required content of the original server OS off-line and upload the result of this transcoding to the original server OS. Thereafter, the original server OS may retrieve the content in the additional encoding completely autonomous without intervention from the active network transcoder ANT.

However, in such an embodiment, the transcoding has to be performed before the actual request is made by an end user. As it is very difficult to anticipate which content item will be required, a very large number of useful transcodings is therefore required to be performed off-line. This will, however, lead to a great amount of additionally stored encodings of the required content. To cope with this problem, a schedule prioritization may have to be performed to create all transcodings as identified. However, the off-line transcoding according to the third embodiment may be preferred with respect to a real time transcoding as described in the first or second embodiment when the processing bandwidth or the network bandwidth may not be sufficient for a real time transcoding.

According to a fourth embodiment which is based on the first or second embodiment, the active network transcoder may record a copy of the result of each transcoding operation. Thereafter, the required data is streamed to the renderer but this data can also be recorded by the active network transcoder. After completion, the recorded result can be loaded to the original server. The active network transcoder ANT may replace the URL in the associated <res> element pointing to the active transcoder by an URL pointing to the uploaded content, i.e. it points to the original server. Therefore, each content item has only to be transcoded once into a particular encoding.

According to a further embodiment, the active network transcoder apart from being used as transcoder also adapted to perform protocol conversions.

The above described transcoding can be performed in real time or alternatively off-line such that the transcoded content is stored for example n a server and the CDS is updated accordingly to indicate where the transcoded content is stored.

In addition to the above described embodiments, a transcoder may also be provided in the original server OS to update the CDS of the original server by adding additional resource elements in order to provide encodings for all renderers in the network.

The above described principles of the invention may be used to scan the content according to the CDS of servers and the rendering capabilities of the renderers in the network to register only those resource elements which are really required for the renderers. This can be used to improve the efficiency as only those resource elements are introduced which actually relate to any required transcodings. All resource elements relating to transcodings which are not required by the renderers actually in the network can be deleted. Alternatively or in addition, a full transparency network can be achieved by inserting the transcoded content or resource elements relating to the transcoded contents into the CDS of the original server.

According to the invention, the content of a CDS of a server and the rendering capabilities of the renderers in the network is determined and compared. Here, only those <res> elements which are required to ensure that the renderers can reproduce the content are added to the CDS. Those which are not required by the renderers will not be added to the CDS.

According to a further embodiment of the invention a transcoder unit for transcoding within an UPnP network comprising at least one first server OS, at least one UPnP renderer and at least one UPnP control point is provided The transcoding unit comprises a control point unit ECP for browsing the content directory service CDS of the at least one server OS to determine the available content and the available encoding of the content, and for comparing the available encoding of the content according to the content directory service CDS of the at least one first server OS with a predetermined set of at least one encoding of the content. The transcoder unit is adapted to update the content directory service CDS of the at least one first server OS based on the comparison results by adding at least one additional resource element res or an additional content relating to an encoding of the content into the content directory service CDS of the at least one first server OS if the content directory service CDS of the at least one first server OS does not contain the at least one encoding of the predetermined set of encodings.

The adding of an additional <res> may only occur if: (1) the first server does not contain at least one encoding of the predetermined set of encodings, but (2) does contain at least one encoding of another predetermined set of encodings. I.e. the transcoder may have a limited ability of transcoding content. It may only be able to translate from a limited set of predetermined formats into another limited set of predetermined formats. For, example, if the CDS-entry contains an encoding in MPEG2 transport stream with MPEG2 video and MPEG1-L2 audio, but does not contain an encoding in MPEG4 video with AAC audio then it will insert a <res> element (additional content) to effectuate the transcoding from the first encoding into the second encoding.

Accordingly, a transcoder is provided which is able to update the server or the CDS of the server by adding an additional res in a (predefined) encoding for at least some of the content in the CDS. This may be limited to that content which has original encodings that the transcoder is capable of transcoding from. It should be noted, that there may even be a further reason why not all contents can be transcoded into the predefined encoding. For example if the content is a picture and the predefined encoding is some audio codec, than it makes no sense to transcode the picture into sound.

The CDS can be updated based on a predetermined or predefined set of encodings, i.e. without determining the rendering capabilities of the renderers. This could be performed in a situation where the rendering capabilities of the renderers is know.

In other words, transcoded content can be added to the CDS of the server without determining the rendering capabilities of the renderers (preferably the rendering capability of at least one of the renderers is already known).

The principles of the invention may be applied to a dedicated transcoding device in an UPnP network. However, an active network transcoder may also be included in a home media server. In addition to serving and possibly transcoding its own content, the home media server will also be able to transparently provide transcoding services for other UPnP AV servers in the network. The benefit being that adding the ANT to the home media server is transparent with respect to the UPnP AV server in that same device. The UPnP AV server could be a third party software package (e.g. in binary form), which does not have to be altered to add transcoding ability to the device (i.e. by means of the embedded ANT). This benefit is obtained because the interaction between the ANT and any UPnP AV server will be based on standardized protocols (e.g. the CDS:UpdateObject method).

Such a home media server type of device could be a typical CE device. However, it can also be implemented in an application program running on a personal computer.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. Method of transcoding of content stored on a first server within an UPnP network having at least one first server, at least one UPnP renderer and at least one UPnP control point, comprising the steps of:
   browsing content directory services of the at least one first server to determine the available content and the available encodings of the content,
   determining the rendering capabilities of the at least one renderer,
   comparing the rendering capabilities of the at least one renderer with the available content and the available encoding of the content according to the content directory service of the at least one first server, and
   updating at least part of the content directory service of the at least one first server according to the results of the comparison of the rendering capabilities of the at least one renderer and the available content and encodings of the content of the content directory service of the at least one first server,
   wherein the step of updating comprises: adding at least one of an additional resource element and an additional content relating to an encoding of the available content into the content directory service of the at least one first server if the content directory service of the at least one first server does not contain a required encoding of the available content to enable a rendering on the at least one renderer.

2. Method according to claim 1, wherein the step of updating comprises:
removing resource elements relating to encodings of the content which are not required by the at least one renderer from the content directory service of the at least one first server.

3. Method according to claim 1, wherein the additional resource element contains information with respect to the uniform resource location of the required encoding for the content.

4. Method according to claim 1, further comprising the step of: transcoding the content to the required encoding such that the at least one renderer is able to render the content.

5. Method according to claim 1, wherein the resource element comprises information with respect to a transcoding service for transcoding the content into the required encoding, wherein the transcoding service is performed within or outside the UPnP network.

6. Method according to claim 5, wherein the content is encoded by the transcoding service into a coding which is required by the renderer.

7. Method according to claim 1, wherein the resource element which is added into the content directory service of the at least one server contains an URL pointing to the original content, wherein the URL contains information with respect to at least one of the required encoding of the content, and information with respect to the original encoding of the content.

8. Method according to claim 7, wherein the URL indicated by the resource element further comprises at least one of information with respect to the transcoder for transcoding the content into a second encoding, and information with respect to an external transcoding service for transcoding the content into the second encoding.

9. Method according to claim 1, further comprising the steps of: storing information with respect to UPnP renderers, which have previously been within the UPnP network, and adding at least one additional resource element into the content directory service which relates to a required encoding for the stored renderers.

10. Method according to claim 1, wherein the updating of the content directory service is performed based on actual transcoding capabilities.

11. Transcoder unit for transcoding within an UPnP network having at least one first server, at least one UPnP renderer and at least one UPnP control point, comprising:
a control point unit for browsing the content directory service of the at least one server to determine the available content and the available encoding of the content, for determining the rendering capabilities of the at least one renderer and for comparing the rendering capabilities of the at least one renderer with the available content and the available encoding of the content according to the content directory service of the at least one first server,
wherein the transcoder unit is adapted to update the content directory service of the at least one first server based on the comparison results and its transcoding capability,
wherein the control point unit is adapted to add at least one of an additional resource element and an additional content relating to an encoding of the available content into the content directory service of the at least one first server if the content directory service of the at least one first server does not contain the required encoding of the available content to enable a rendering on the at least one renderer.

12. UPnP network system, comprising: at least one first server, at least one UPnP renderer and at least one UPnP control point, and at least one transcoder unit according to claim 11.

13. UPnP network system according to claim 12, wherein the at least one first server comprises a transcoder for browsing the content directory service of the at least one server to determine the available content and the available encoding of the content, for determining the rendering capabilities of the at least one renderer and for comparing the rendering capabilities of the at least one renderer with the available content and the available encoding of the content according to the content directory service of the at least one server and for updating the content directory service based on the comparison results.

14. A computer program for transcoding of content stored on a first server, the computer program comprising program code for causing a transcoder unit according to claim 11 to carry out the steps of:
browsing content directory services of at least one first server to determine the available content and the available encodings of the content,
determining the rendering capabilities of at least one renderer, comparing the rendering capabilities of the at least one renderer with the available content and the available encoding of the content according to content directory service of the at least one first server, and
updating at least part of the content directory service of the at least one first server according to the results of the comparison of the rendering capabilities of the at least one renderer and the available content and encodings of the content of the content directory service of the at least one first server,
when the computer program is run on a computer controlling the transcoder unit.

15. Transcoder unit for transcoding within an UPnP network comprising at least one first server, at least one UPnP renderer and at least one UPnP control point, comprising:
a control point unit for browsing a content directory service of the at least one server to determine the available content and the available encoding of the content, and for comparing the available encoding of the content according to the content directory service of the at least one first server with a predetermined set of at least one encoding of the content,
wherein the transcoder unit is adapted to update the content directory service of the at least one first server based on the comparison results and on its transcoding capability by adding at least one additional resource element or an additional content relating to an encoding of the content into the content directory service of the at least one first server if the at least one encoding of the predetermined set of encodings is not among the encodings of the content directory service of the at least one first server.

* * * * *